United States Patent
Hendrickson

(10) Patent No.: US 7,208,031 B1
(45) Date of Patent: Apr. 24, 2007

(54) PORTABLE PAINT SPRAY CAPTURE ASSEMBLY

(76) Inventor: Daniel E. Hendrickson, 465 Amesbury Rd., Lancaster, PA (US) 17601

( * ) Notice: Subject to any disclaimer, the term of this patent is extended or adjusted under 35 U.S.C. 154(b) by 208 days.

(21) Appl. No.: 11/144,249

(22) Filed: Jun. 3, 2005

(51) Int. Cl.
*B01D 47/02* (2006.01)

(52) U.S. Cl. .......................... 96/351; 96/352; 55/383; 55/467; 55/473; 55/DIG. 46

(58) Field of Classification Search .......... 96/351–354; 55/355, 383, 385.7, 467, 473, DIG. 18, DIG. 46, 55/FOR. 134, FOR. 146; 261/30, 74, 121.1, 261/123, 122.1, 124
See application file for complete search history.

(56) References Cited

U.S. PATENT DOCUMENTS

| | | | | |
|---|---|---|---|---|
| 1,520,267 A * | 12/1924 | Waltz | ........................... | 454/55 |
| 2,066,683 A | 1/1937 | Grubelic | | |
| 3,385,032 A | 5/1968 | Crabbe | | |
| 3,528,781 A | 9/1970 | Gelfman et al. | | |
| 3,936,283 A | 2/1976 | Solis | | |
| 4,017,280 A | 4/1977 | Cleman et al. | | |
| 4,231,289 A | 11/1980 | Domicent | | |
| 4,237,780 A * | 12/1980 | Truhan | ........................ | 454/52 |
| 4,666,487 A * | 5/1987 | Gerault | ........................ | 65/530 |
| 4,874,404 A * | 10/1989 | Boswell | ........................ | 95/151 |
| 6,391,093 B1 * | 5/2002 | French et al. | .................. | 95/226 |
| 6,500,244 B2 * | 12/2002 | Sanchez | ....................... | 96/340 |
| 6,896,712 B2 * | 5/2005 | Ryan et al. | ................. | 55/385.2 |
| 6,955,715 B1 * | 10/2005 | Tittle | ............................ | 96/351 |
| 2002/0023541 A1 * | 2/2002 | Sanchez | ....................... | 96/340 |

* cited by examiner

*Primary Examiner*—Scott Bushey
(74) *Attorney, Agent, or Firm*—Martin Fruitman

(57) ABSTRACT

The apparatus is a portable paint spray capture apparatus that limits dispersion of sprayed paint and permits spray painting small surfaces in unenclosed areas without harming the environment or nearby objects. An open top container is located below the surface being painted and hoses interconnect the container to a vacuum device drawing air from the container and through a water trap that collects paint particles. Air leaving the water trap passes through an underwater mesh screen to form smaller bubbles to help separate out the paint particles. Air movers push air from opposite sides of and toward the center of the surface being painted. Significant air flow paths are thereby established from the sides of the spray area into the container below it, and virtually all of the paint not adhering to the surface being painted is collected by the water trap.

4 Claims, 1 Drawing Sheet

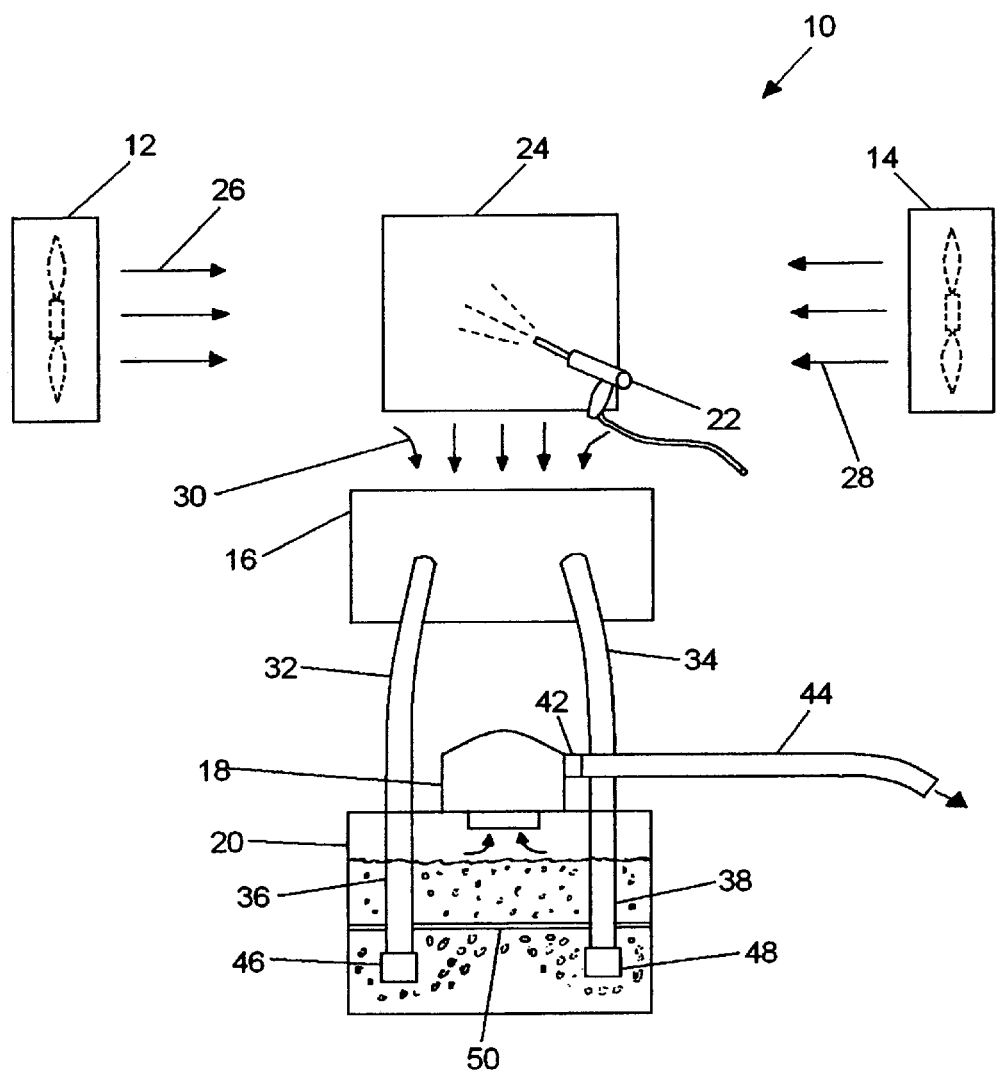

PORTABLE PAINT SPRAY CAPTURE ASSEMBLY

BACKGROUND OF THE INVENTION

This invention deals generally with spray painting and more specifically with an apparatus that permits safely spray painting small surfaces in an unenclosed area.

Most of us assume that professional paint spraying is always done within an enclosed environment, in enclosures usually referred to as paint booths or paint rooms. While that is usually the case, there are situations in which small areas of large objects are spray painted in the open environment. For example, bumpers of automobiles are frequently painted out in the open simply because the other options of moving the automobile into a large enclosure specifically designed for spray painting or removing the bumper so it could be put into a smaller paint booth would be time consuming and expensive. If the painting is done carefully, car bumpers can be spray painted wherever they are located, for instance, on a car sales lot.

The important aspect of such a job is the "done carefully" aspect. There is always stray paint, called "overspray", generated by a spray painting operation, and the slightest breeze can disperse such overspray into the environment and onto nearby objects such as other vehicles. Moreover, the spray painting equipment itself creates air movement that may disperse paint beyond the specific object being painted. Such errant paint can be very costly to remove.

Some portable spray rooms have been available that are constructed of metal tubing and plastic sheet, but even the simplest of such devices require significant time to assemble and disassemble, so that they also are uneconomical for work on a single object such as one automobile bumper.

It would be very beneficial to have available a portable apparatus that required only simple and rapid set up and required that the vehicle only be moved a short distance from other vehicles in order to have small areas on the vehicle painted.

SUMMARY OF THE INVENTION

The present invention furnishes a paint restricting assembly with only a very few components and several interconnecting hoses. This is accomplished by establishing air currents that limit the spray to a small region in the immediate vicinity of the surface being painted, and by creating a paint capturing vacuum in the region directly below the surface being painted.

The preferred embodiment uses only five major components and two interconnecting hoses to accomplish these actions. The air currents are produced by locating two air movers such as fans or blowers on opposite sides of the painting location. The air movers are placed at approximately the same height as the work to be painted, to the right and left of the work, and a little forward of the work surface, so that the air streams developed are on the side of the work surface from which the paint is being sprayed. When these air movers are operating, they blow air streams toward each other, and the air streams meet approximately in front of the work to be painted. The air flow thereby prevents overspray from moving away from the painting area.

The other function of the invention is to capture the paint vapor and particles that do not adhere to the surface being painted. To accomplish this, an open top container is placed directly below the sprayed surface and one or more hoses are connected to the container. A workshop type vacuum cleaner unit is used to establish the vacuum that draws air and paint particles into the open top container. However, the vacuum unit uses a capture container quite different from the conventional vacuum cleaner container.

The vacuum capture container of the preferred embodiment of the invention is a sealed container with a substantial amount of water within it, and the end of the hose or hoses is located below the water line. This causes the paint particles to be trapped in the water along with any paint vapors that accompany the paint particles, while the cleaned air from the hoses bubbles through the water and is pulled out of the water trap by the vacuum unit and discharged into the environment.

A further aid to cleaning the air is a screen trap mounted on the underwater open end of each hose or across the interior of the water trap. The screen decreases the size of the air bubbles within the water trap, and prevents large bubbles that might retain paint vapor or particles within them from exiting the water trap.

The present invention thereby prevents overspray from leaving the region immediately adjacent to the painting area and also captures overspray paint for easy disposal. Thus, the invention can be used to form a "virtual spray booth" environment wherever any spray painting is required.

BRIEF DESCRIPTION OF THE DRAWING

The FIGURE is a simplified schematic diagram of the preferred embodiment of the invention.

DETAILED DESCRIPTION OF THE INVENTION

The FIGURE is a simplified schematic diagram of spray limiting apparatus 10 of the preferred embodiment of the invention. Apparatus 10 includes air movers 12 and 14, open top container 16, vacuum generator 18, and water trap 20. The FIGURE shows water trap 20 as if its near side were constructed of a transparent material for better viewing of its inner construction, but such material is an unlikely selection for practical use.

The FIGURE also depicts typical paint spray gun 22 and surface 24 being painted. It is surface 24 being painted that determines the arrangement of the components of spray limiting apparatus 10. Air movers 12 and 14 are placed on opposite sides of surface 24, and located so that the airstreams generated by the air movers meet on the side of surface 24 from which the paint is being sprayed.

In the preferred embodiment of the invention air movers 12 and 14 are 16 inch diameter fans rated at 300 watts, and they are operated at 1720 RPM. These fans are each located 4 to 6 feet from the nearest edge of surface 24, in a plane 24 inches in front of the plane of surface 24, and with their centers 6 inches below the height of the center of surface 24.

These particular dimensions can vary with the size and power of the air movers used, but when properly selected and functioning with the paint capture system described, the air movers will create airstreams 26, 28, and 30 that prevent overspray from leaving the immediate area of surface 24.

The restriction of the dispersion of the overspray is actually a result of the location and operation of fans 12 and 14 along with airflow 30 that moves downward from surface 24. Airflow 30 is the result of vacuum generator 18 drawing air into open top container 16. Open top container 16 is centered on work surface 24 and located just below surface 24, and extends for the most of the width of the portion being painted, so that it picks up most of the paint particles not adhering to surface 24. Vacuum generator 18 is connected to open top container 16 through hoses 32 and 34 and air tight water trap 20. Air stream 30 moves through hoses 32 and 34 and pipes 36 and 38 that are immersed in water 40 within water trap 20. The airflow then moves up through water 40, and is pulled into vacuum generator 18 and out into the environment through air output 42 to which an exit hose 44 can be attached if desired.

As the air moves through water 40, virtually all the paint vapor and particles are trapped within the water. This trapping action is enhanced by the action of screens 46 and 48 mounted on the ends of pipes 36 and 38 or screen 50 which is across the entire area of water trap 20 and mounted above the open ends of pipes and 38. Regardless of where the screens are located their operation is the same. They break the larger air bubbles into smaller bubbles and trap paint particles to reduce the likelihood that paint particles will be left in and accompany the air exiting vacuum generator 18.

In the preferred embodiment, for a typical paint surface such as an automobile bumper that is 4½ feet wide, the open top area of container 16 is 4 feet wide by 1 foot deep, and the depth of the container is 5 inches. Vacuum generator is a 6.5 Hp workshop vacuum, and water trap 20 is 16½ inches in diameter, 15½ inches deep, and holds 10 gallons of water. Hoses 32 and 34 are each 2¼ inches in diameter and 6½ feet long, pipes 36 and 38 are 1½ inches in diameter and 14 inches long, and the air from the hoses enters water trap 20 approximately 6 inches below the water surface. The screen material used in screens 46, 48, and 50 is conventional fiberglass window screen and has approximately 225 holes per square inch.

In operation, the preferred embodiment of the invention has prevented any overspray beyond 6 to 8 feet from the surface being painted, and the air being exhausted from the vacuum generator has given no indication of the presence of any paint. Furthermore, the paint particles captured within the water trap have been disposed of easily along with other waste paint products. The use of separate components in the invention also makes the invention very portable so that it can be easily be moved from one job to another.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, more or fewer hoses can be used, and different sizes are possible for the air movers and the vacuum generator. Furthermore, additional air movers can be used and vacuum generator 42 need not be directly attached to water trap 20, but could be interconnected to water trap 20 by another hose.

I claim:

1. A paint spray dispersion limiting apparatus comprising:
at least two air movers located on opposite sides of a work surface being spray painted, with the air movers positioned so the airstreams generated meet at a point located on the side of the work surface from which the paint is being sprayed;
an open top container located below the work surface and on the side of the work surface from which the paint is being sprayed;
at least one hose connected to the open top container and with access to the interior of the open top container;
a water trap that is a sealed container containing a volume of water, with the water trap connected to each hose, and each hose having an open end that terminates below the surface of the water within the water trap; and
a vacuum generator interconnected with the water trap and moving air out from within the water trap.

2. The apparatus of claim 1 further including screen material located below the water surface of the water tap and also located so that air bubbles moving from the hose end to the water surface pass through the screen.

3. The apparatus of claim 1 wherein the vacuum generator is attached to the water trap and pulls air directly from the water trap.

4. The apparatus of claim 1 further including an exit hose attached to the vacuum generator.

* * * * *